United States Patent [19]

Wetzel et al.

[11] Patent Number: 5,742,225
[45] Date of Patent: Apr. 21, 1998

[54] ARRANGEMENT FOR SIGNAL TRANSMISSION BETWEEN A TRANSMITTING STATION AND A RECEIVING STATION

[75] Inventors: Gustav Wetzel, Lörrach; Jürgen Meier, Maulburg, both of Germany

[73] Assignee: Endress + Hauser GmbH + Co., Maulburg, Germany

[21] Appl. No.: 637,925

[22] Filed: May 1, 1996

[30] Foreign Application Priority Data

May 24, 1995 [EP] European Pat. Off. ............ 95108008

[51] Int. Cl.$^6$ .................................................. H04M 11/04
[52] U.S. Cl. ................. 340/310.02; 340/310.01; 340/310.06
[58] Field of Search .......... 340/310.01, 310.02, 340/310.06, 310.03; 379/66; 375/37; 178/120

[56] References Cited

U.S. PATENT DOCUMENTS 3,500,132  3/1970  Garrett ........................ 340/310.01
4,777,331  10/1988  Borst ................................. 178/120

FOREIGN PATENT DOCUMENTS 0 244 808  11/1987  European Pat. Off. .

*Primary Examiner*—Jeffery Hofsass
*Assistant Examiner*—Sihong Huang
*Attorney, Agent, or Firm*—Bose McKinney & Evans

[57] ABSTRACT

A transmitting station is connected to a receiving station by a two-wire line via which the supply current required for operating the transmitting station is transferred from the receiving station to the transmitting station. The transmitting station comprises a supply circuit including a voltage regulator for maintaining the operating voltage of the transmitting station constant and an energy store for compensating current and/or voltage fluctuations. Via the two-wire line a signal current, variable between two limit values, is further transferred from the transmitting station to the receiving station. This signal current consists of the supply current for the transmitting station and a supplementary current determined by the transmitting station. For transfer of the communication information between the transmitting station and the receiving station, a symmetrical communication current is superimposed on the signal current. The communication current is superimposed on the current flowing from the two-wire line into the supply circuit of the transmitting station.

6 Claims, 3 Drawing Sheets

ARRANGEMENT FOR SIGNAL TRANSMISSION BETWEEN A TRANSMITTING STATION AND A RECEIVING STATION

BACKGROUND OF THE INVENTION

1. Field of the Invention

The invention relates to an arrangement for signal transmission between a transmitting station and a receiving station connected to each other by a two-wire line, via which, on the one hand, the supply current required for operating the transmitting station is transferred from the receiving station to the transmitting station and via which, on the other hand, an analog signal current variable between two limit values is transferred from the transmitting station to the receiving station, which signal current is composed of the supply current for the transmitting station and a supplementary current determined by the transmitting station, and which signal current is superimposed by a symmetrical communication current for the transfer of communication information between the transmitting station and the receiving station, the transmitting station comprising a supply circuit which includes a voltage regulator for maintaining the operating voltage of the transmitting station constant and an energy store for compensating current and/or voltage fluctuations.

2. Description of the Prior Art

In usual arrangements of this kind there is located in a shunt branch connected to the two-wire line in parallel with the supply circuit a controlled current source which allows the supplementary current to flow via the shunt branch in accordance with the signal current to be tranferred, the supplementary current in the shunt branch also being superimposed by the communication current. Accordingly, only the supply current flows into the supply circuit. For satisfactory functioning of the arrangement the total current flowing via the two-wire line must always be larger than the supply current since the current source derives the difference between the supply current and the total current via the the shunt branch. Since the symmetrical communication current comprises positive- and negative- going equal current/time areas so that it does not vary the signal current, the available supply current is reduced by the amount of the negative-going amplitudes of the communication current. This results in limitations either as regards the magnitude of the supply current or as regards the amplitudes of the communication current.

SUMMARY OF THE INVENTION

The object of the invention is to provide an arrangement of the kind as stated at the outset in which the available magnitude of the supply current is not detrimented by being superimposed by the symmetrical communication current.

According to the invention this object is achieved by providing an arrangement for signal transmission between a transmitting station and a receiving station connected to each other by a two-wire line, via which, on the one hand, the supply current required for operating said transmitting station is transmitted from said receiving station to said transmitting station and via which, on the other hand, an analog signal current variable between two limit values is transferred from said transmitting station to said receiving station, which signal current is composed of said supply current for said transmitting station and a supplementary current determined by said transmitting station, and which signal current is superimposed by a symmetrical communication current for the transfer of communication information between said transmitting station and said receiving station, wherein said transmitting station comprises a supply circuit which includes a voltage regulator for maintaining the operating voltage of said transmitting station constant and an energy store for compensating current and/or voltage fluctuations, and wherein said communication current is superimposed in said transmitting station on the current flowing from said two-wire line into said supply circuit.

Since in the arrangement according to the invention the symmetrical communication current cyclically decreases and increases the current flowing into the supply circuit, the energy of the communication current is stored during the current increase in the energy store of the supply circuit and output to the consumers during the current decrease. In this way use is made of the communication current for the supply so that the same magnitude of the supply current is attainable as in an arrangement in which no communication current is transferred.

DESCRIPTION OF THE PREFERRED EMBODIMENT

Figure 1:
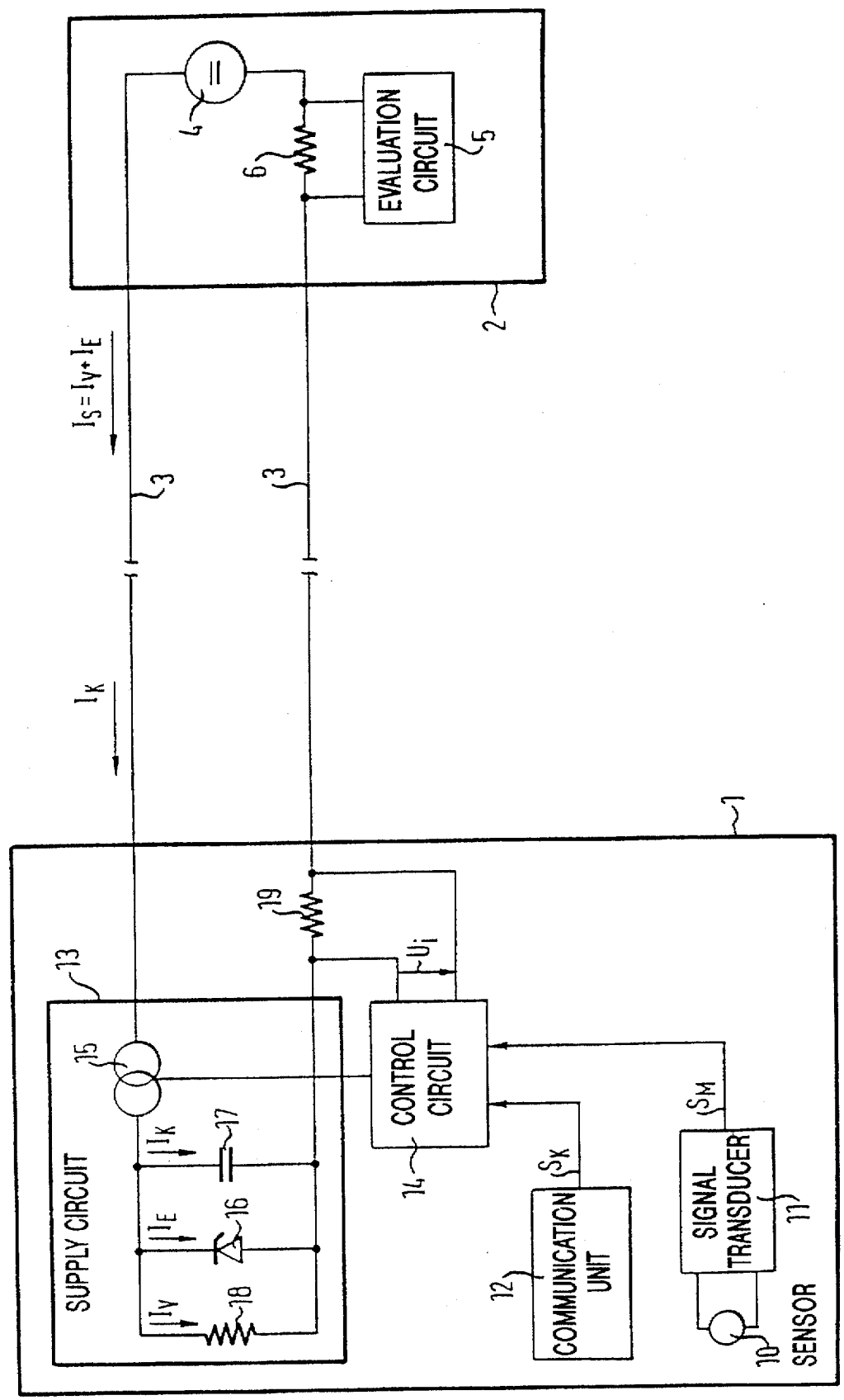
FIG. 1 is a schematic illustration of an arrangement for signal transmission between a transmitting station and a receiving station.

FIG. 1 of the drawings shows schematically a transmitting station 1 which is connected to a receiving station 2 via a two-wire line 3. The transmitting station 1 is in the example illustrated a measuring station in which a physical measured variable (e.g. temperature, pressure, moisture content, level, flow) is measured. The transmitting station 1 includes no energy source of its own, but obtains the supply current $I_V$ required for its operation via the same two-wire line 3 from a voltage source 4 included in the receiving station 2. Via the two-wire line 3 a measured value signal representing the instantaneous value of the measured variable is transferred from the transmitting station 1 to the receiving station 2. In accordance with a usual technique the measured value signal is a signal current $I_S$ flowing via the two-wire line 3 composed of the supply current $I_V$ of the transmitting station 1 and a supplementary current $I_E$:

$$I_S = I_V + I_E$$

The supplementary current $I_E$ is likewise obtained from the voltage source 4 and adjusted in the transmitting station taking into account the prevailing magnitude of the supply current $I_V$ so that the signal current $I_S$ between two given current values (usually the current values 4 mA and 20 mA) represents the measured value to be transferred. The voltage source 4 is a DC voltage source and the currents $I_V$, $I_E$ and $I_S$ are direct currents.

Figure 2:
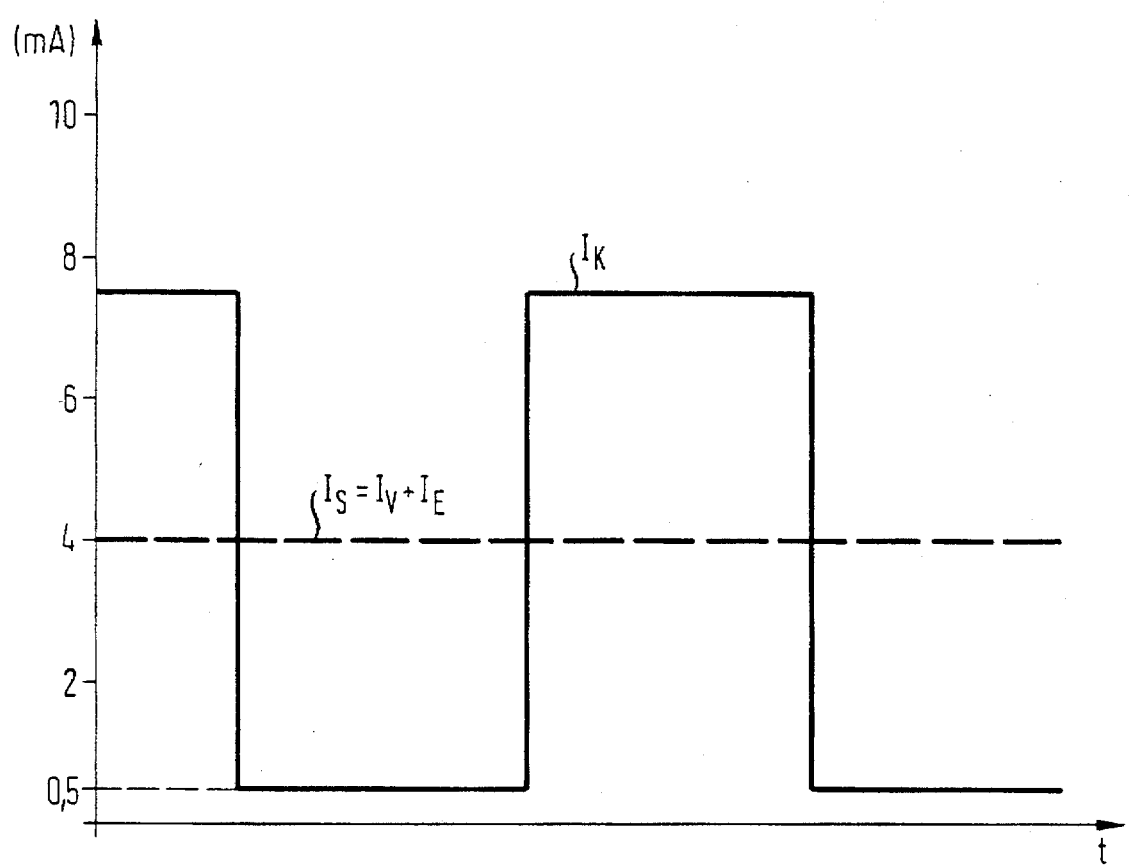
FIG. 2 is a graph depicting the signals transferred in the arrangement of FIG. 1

To detect the physical measured variable the transmitting station 1 includes a sensor 10 and, connected to the sensor 10, a measuring transducer 11 which outputs an electrical signal $S_M$ which always represents the instantaneous value of the measured variable. The transmitting station 1 further includes a communication unit 12 permitting additional information to be transferred from the transmitting station to the receiving station via the two-wire line 3 without this disturbing the transfer of the measured value. The information is transferred by the signal current $I_S$ being superimposed by a symmetrical communication current $I_K$ in the form of an alternating current comprising equal positive- and negative-going current/time areas so that the signal current $I_S$ on an average is not influenced thereby. FIG. 2 shows the signal current $I_S$ transferred via the two-wire line 3 which is composed of the supply direct current $I_V$ and the supplementary current $I_E$ which is superimposed by the communication current $I_K$ in the form of symmetrical square wave alternating pulses. The symmetrical square wave alternating pulses of the communication current $I_K$ may be for example pulse code modulated by the information to be transferred.

The receiving station 2 includes an evaluation circuit 5 which obtains from the total current transferred via the two-wire line 3 the measured value information, on the one hand, and the communication information, on the other. For this purpose a resistor 6 is inserted in the two-wire line across which a voltage materializes which is proportional to the total current transferred via the two-wire line and which is supplied to the evaluation circuit 5.

For implementing the aforementioned functions:
power supply of the various consumers in the receiving station;
adjusting the signal current $I_S$ according to the measured value to be transmitted;
superimposing the symmetrical communication current $I_K$ on the signal current $I_S$;

the transmitting station 1 includes a supply circuit 13 and a control circuit 14. The supply circuit 13 includes a controllable current source 15 which is inserted in the two-wire line 3, and a Zener diode 16 which is connected in parallel to a capacitor 17 to the two-wire line behind the current source 15. The resistor 18 shown in FIG. 1 represents symbolically the total resistance of the current consumers existing in the transmitting station 1 which are primarily formed by the signal transducer 11 with the sensor 10, the communication unit 12 and the control circuit 14. The Zener diode 16 serves to maintain the operating voltage in the transmitting station i constant, and the capacitor 17 forms an energy store for compensating current or voltage fluctuations.

The control circuit 14 determines the total current forced from the current source 15 flowing via the two-wire line 3. This circuit receives, on the one hand, the signal $S_M$ furnished by the measuring transducer 11 and, on the other, a signal $S_K$ furnished by the communication unit 12 representing the information to be transferred via the two-wire line 3. The control circuit 14 further receives an actual value voltage $U_i$ which is tapped from a resistor 19 inserted in the two-wire line 3 and is thus porportional to the actual value of the total current flowing via the two-wire line 3. Due to these input signals the control circuit 14 furnishes to the control input of the current source 15 a control signal which adjusts the current determined by the current source 15 so that it corresponds to the measured value indicated by the measured value signal $S_M$ in the given range between 4 mA and 20 mA and that this current is superimposed by a symmetrical communication current which represents the communication signal $S_K$ furnished by the communication unit 12. This results in the signal current $I_S$ on which the symmetrical communication current $I_K$ is superimposed.

It is thus evident that in addition to the supply current $I_V$ also the supplementary current $I_E$ and the communication current $I_K$ flow via the current source 15 into the supply circuit 13 supplying the consumer circuit (resistor 18). The consumer circuit 18 accepts only the supply current $I_V$, and the supplementary current $I_E$ passes via the Zener diode 16. Since the communication current $I_K$ cyclically increases and decreases the signal current $I_S$, the energy of the communication current is stored in the capacitor 17 during the current increase which re-outputs this stored energy during the current decrease. The advantageous effect achieved thereby is evident from the graph in FIG. 2 showing the case in which the signal current $I_S$ transferred via the two-wire line 3 has the lower limit value of 4 mA whilst an amplitude of 3.5 mA is shown for the communication current $I_K$. Since in conventional circuits the total current flowing via the two-wire line always needs to be greater than the supply current the supply current $I_V$ would have to be smaller than 0.5 mA in the case shown; since this is normally not possible, the amplitude of the communication current $I_K$ would have to be reduced accordingly. As compared to this, in the circuit shown in FIG. 1 almost the full lower limit value of 4 mA is available for the supply current $I_V$ and the amplitude of the communication current $I_K$ may likewise almost attain this value.

Figure 3:
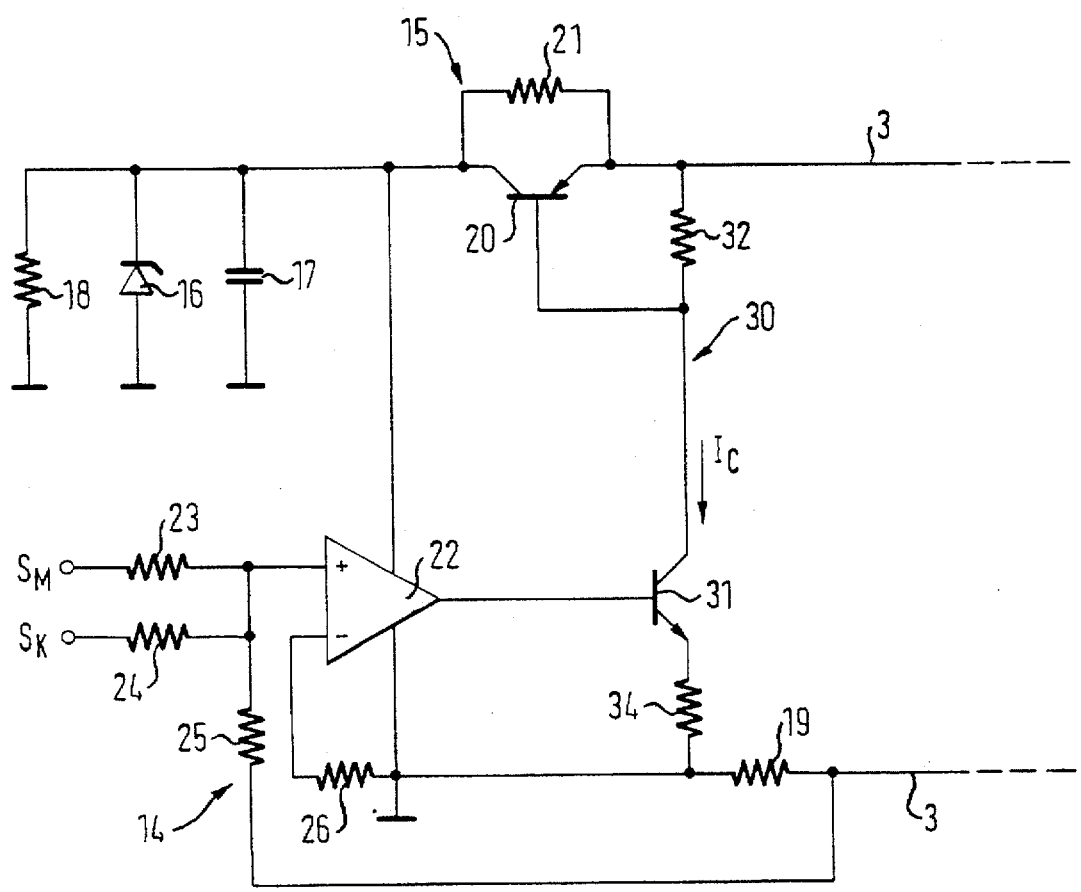
FIG. 3 is a circuit diagram of the transmitting station of FIG. 1 showing the configuration of the controllable current source and the control circuit in more detail.

FIG. 3 shows an example embodiment of the current source 15 and the control circuit 14 included in the transmitting station 1 in FIG. 1. In FIG. 3 also the Zener diode 16, the capacitor 17, resistor 18 and the two-wire line 3 leading to the receiving station are evident. The current source 15 is formed by a pnp transistor 20, the emitter-collector circuit of which is inserted in the two-wire line parallel to a resistor 21.

The control circuit 14 includes an operational amplifier 22 which receives at its non-inverting input the measured value signal $S_M$ via a resistor 23, the communication signal $S_K$ via a resistor 24 and the actual value voltage tapped from resistor 19 via a resistor 25. The inverting input of the operational amplifier 22 is connected to ground via a resistor 26.

The output signal of the operational amplifier 22 controls the current in a shunt branch 30 which is connected before the current source 15 between the two conductors of the two-wire line 3. This shunt branch includes an npn transistor 31, the collector of which is connected to the one conductor of the two-wire line 3 via a series resistor 32 and the emitter of which is connected to ground via a resistor 34, the other conductor of the two-wire line 3 being connected to ground via the resistor 19. The base of the transistor 31 is connected to the output of the operational amplifier 22, resulting in the transistor 31 being controlled so that it allows a current $I_C$ to flow in the shunt branch 30 corresponding to the sum of the signals $S_M$ and $S_K$ supplied to the operational amplifier 22. The shunt branch 30 is configured with a high impedance so that the current $I_C$ is small as compared to the signal current $I_S$ flowing via the two-wire line 3. The collector current $I_C$ of the transistor 31 forms the control current for driving the transistor 20, the base of which is connected to the point connecting the resistor 32 and the collector of transistor 31. As a result of this the transistor 20 is driven such that the current determined by the current source 15 has the value and time profile dictated by the signals $S_M$ and $S_K$.

It will be appreciated that various changes may, of course, be made to the circuit illustrated by way of example in FIG. 3 as known to the person skilled in the art. For instance, for maintaining the operating voltage constant, instead of the Zener diode 16 a so-called shunt controller may be made use of. In the same way, the controllable current source may also be formed by means other than a pnp transistor.

We claim:

1. An arrangement for signal transmission between a transmitting station and a receiving station connected to each other by a two-wire line, via which, on the one hand, the supply current required for operating said transmitting station is transmitted from said receiving station to said transmitting station and via which, on the other hand, an analog signal current variable between two limit values is transferred from said transmitting station to said receiving station, which signal current is composed of said supply current for said transmitting station and a supplementary current determined by said transmitting station, and which signal current is superimposed by a symmetrical communication current for the transfer of communication information between said transmitting station and said receiving station, wherein said transmitting station comprises a supply circuit which includes a voltage regulator for maintaining the operating voltage of said transmitting station constant and an energy store for compensating current and/or voltage fluctuations, and wherein said communication current is superimposed in said transmitting station on the current flowing from said two-wire line into said supply circuit.

2. The arrangement as set forth in claim 1, wherein said current flowing from said two-wire line into said supply circuit also includes said supplementary current.

3. The arrangement as set forth in claim 1, wherein said transmitting station includes a controllable current source determining the current flowing from said two-wire line into said supply circuit as well as a control circuit for controlling said current source by a control signal including the communication information to be transferred.

4. The arrangement as set forth in claim 3, wherein said control signal controls said controllable current source such that the current flowing from said two-wire line into said supply circuit consists of said supply current, said supplementary current and said superimposed symmetrical communication current.

5. The arrangement as set forth in claim 2, wherein said transmitting station includes a controllable current source determining the current flowing from said two-wire line into said supply circuit as well as a control circuit for controlling said current source by a control signal including the communication information to be transferred.

6. The arrangement as set forth in claim 5, wherein said control signal controls said controllable current source such that the current flowing from said two-wire line into said supply circuit consists of said supply current, said supplementary current and said superimposed symmetrical communication current.

* * * * *